(12) United States Patent
Shiraishi

(10) Patent No.: US 7,907,484 B2
(45) Date of Patent: Mar. 15, 2011

(54) REPRODUCING APPARATUS AND REPRODUCTION METHOD

(75) Inventor: Junya Shiraishi, Nagano (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 12/191,653

(22) Filed: Aug. 14, 2008

(65) Prior Publication Data

US 2009/0073830 A1 Mar. 19, 2009

(30) Foreign Application Priority Data

Sep. 14, 2007 (JP) .................................. 2007-239630

(51) Int. Cl.
*G11B 5/09* (2006.01)

(52) U.S. Cl. ............... 369/47.26; 369/47.25; 369/53.13; 369/53.15

(58) Field of Classification Search ............... 369/47.25, 369/47.26, 53.13, 53.15, 44.37, 59.25, 124.07
See application file for complete search history.

(56) References Cited

U.S. PATENT DOCUMENTS

| | | | |
|---|---|---|---|
| 2002/0159347 A1* | 10/2002 | Sasaki et al. | 369/44.37 |
| 2003/0012105 A1 | 1/2003 | Miyazaki et al. | |
| 2003/0076761 A1 | 4/2003 | Abe et al. | |
| 2006/0188819 A1* | 8/2006 | Takazawa et al. | 430/270.18 |
| 2006/0215520 A1* | 9/2006 | Lai et al. | 369/53.15 |
| 2007/0153661 A1* | 7/2007 | Ando et al. | 369/59.25 |
| 2007/0247998 A1* | 10/2007 | Maruyama et al. | 369/124.07 |

FOREIGN PATENT DOCUMENTS

| | | |
|---|---|---|
| JP | 2002-288839 | 10/2002 |
| JP | 2003-132533 | 5/2003 |
| JP | 2005-285293 | 10/2005 |
| JP | 2006-114074 | 4/2006 |
| JP | 2006-120255 | 5/2006 |
| WO | WO 01/52249 | 7/2001 |

* cited by examiner

*Primary Examiner* — Thuy N Pardo
(74) *Attorney, Agent, or Firm* — Oblon, Spivak, McClelland, Maier & Neustadt, L.L.P.

(57) ABSTRACT

A reproducing apparatus includes the following elements. A reproducing head unit irradiates an optical disk with a laser beam to obtain a reproduced signal. An offset cancellation circuit cancels an offset element of the reproduced signal. An automatic gain control circuit adjusts the amplitude of the reproduced signal processed through the offset cancellation circuit. A band switching control unit detects a fingerprint period during which the reproduced signal is affected by a fingerprint on the surface of the optical disk and, for the fingerprint period, switches a frequency band in which the offset cancellation circuit and the automatic gain control circuit function to a higher frequency band than that associated with a non-fingerprint period. A decoding unit decodes the reproduced signal processed through the automatic gain control circuit to output binary data. A data reproduction processing unit performs reproduction processing on the binary data to obtain reproduced data.

6 Claims, 14 Drawing Sheets

REPRODUCED
SIGNAL

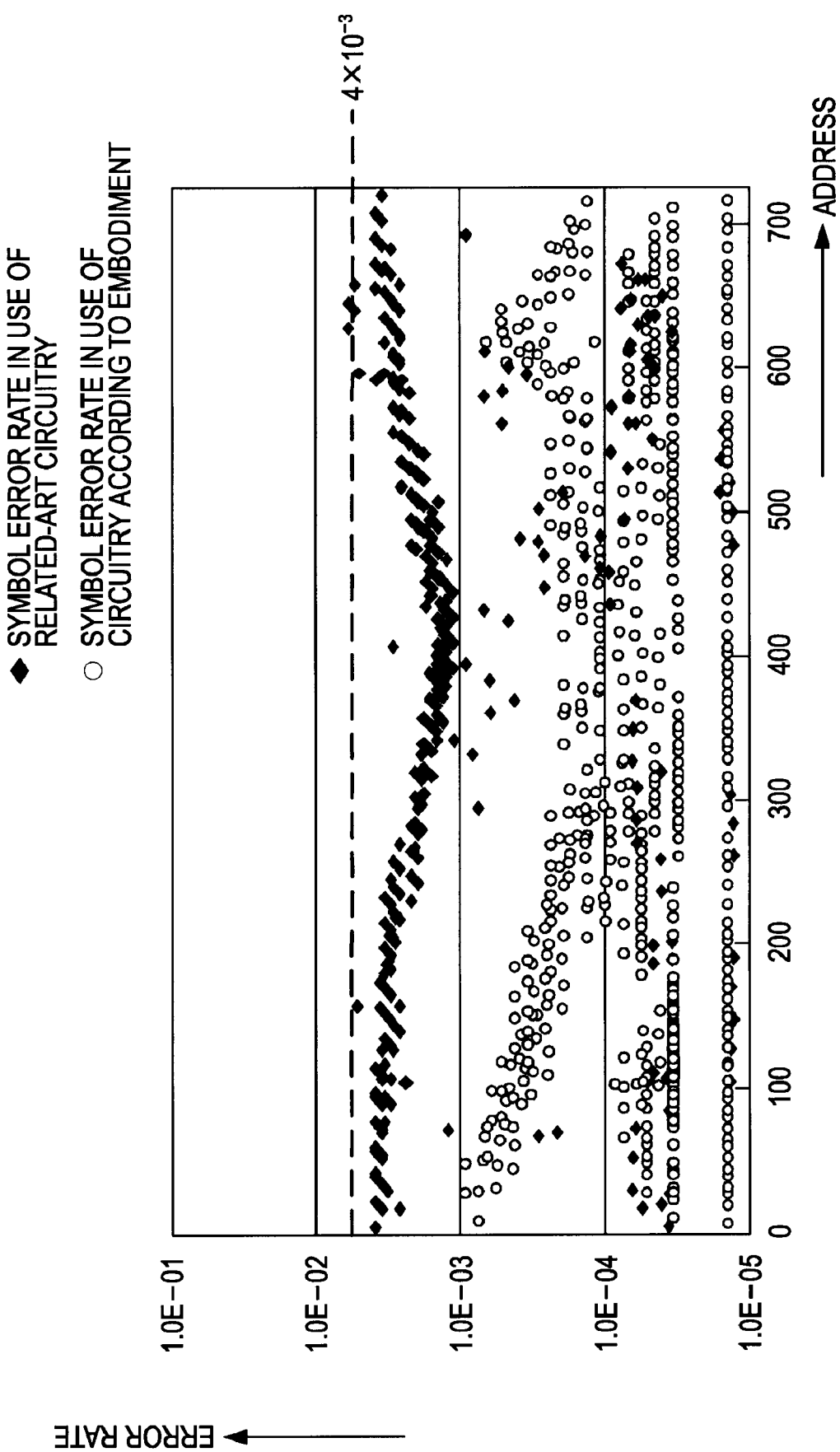

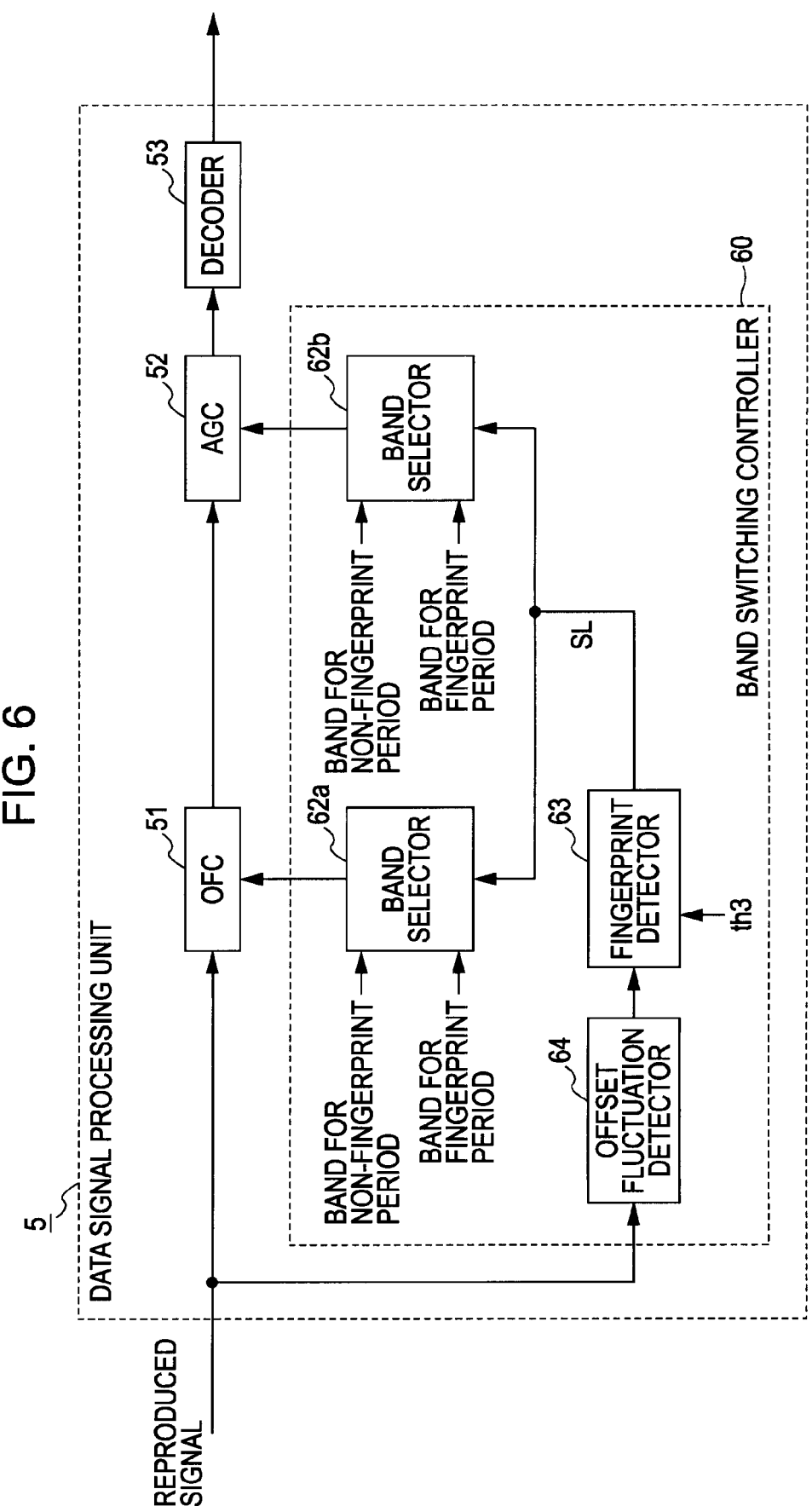

REPRODUCED
SIGNAL

CENTER LEVEL

↓ OFFSET CANCELLATION

CENTER LEVEL

↓ AGC

CENTER LEVEL

REPRODUCING APPARATUS AND REPRODUCTION METHOD

CROSS REFERENCES TO RELATED APPLICATIONS

The present invention contains subject matter related to Japanese Patent Application JP 2007-239630 filed in the Japanese Patent Office on Sep. 14, 2007, the entire contents of which are incorporated herein by reference.

BACKGROUND OF THE INVENTION

1. Field of the Invention

The present invention relates to an apparatus and method for reproducing data from an optical disk.

2. Description of the Related Art

Related-art techniques are disclosed in Japanese Unexamined Patent Application Publication Nos. 2006-114074, 2005-285293, 2006-120255, 2002-288839, and 2003-132533 and PCT Publication No. WO 2001/052249.

Recently, high-recording-density optical disks, such as "Blu-ray Disc (registered trademark)", have been in practical use. As for non-cartridge type media, i.e., bare disks, recording surfaces thereof are often contaminated with fingerprints while being handled.

In the case where the recording surface of such an optical disk is contaminated with a fingerprint, reproducing light and recording light may scatter and attenuate in a contaminated area, so that reproduced signal quality and recording signal quality are remarkably degraded. At the worst, data may not be reproduced from the contaminated area.

When a portion contaminated with a fingerprint is irradiated with a laser beam in order to reproduce data, the detected amount of reflected light decreases, thus reducing the amplitude of a reproduced signal.

When data is recorded onto, for example, a phase-change optical disk or a dye-change optical disk whose recording surface is contaminated with a fingerprint, a laser beam for recording is disturbed by the fingerprint, resulting in power loss. Accidentally, the shape of a mark formed on the optical disk is disturbed. Disadvantageously, the degree of modulation is reduced during reproducing (playback), so that a reproduced signal in which the asymmetry is disturbed is obtained.

FIGS. 12A and 12B illustrate the waveforms of reproduced signals obtained as reflected light information during reproducing. FIG. 12A shows the waveform of a signal reproduced from an area contaminated with a fingerprint. FIG. 12B shows the waveform of a signal reproduced from an area that is not affected by a fingerprint.

As will be understood from FIGS. 12A and 12B, the amplitude of the reproduced signal waveform is significantly disturbed by the influence of the fingerprint. As the disturbance on the asymmetry, a center level of the amplitude of the reproduced signal also varies (an offset fluctuation in the center level).

To eliminate the influence of the fingerprint, signal processing shown in FIG. 11 have been performed. Specifically, a reproduced signal obtained as information contained in light reflected from an optical disk is supplied through an offset canceller 81 and an automatic gain control (AGC) circuit 82 to a decoder 83.

As the waveform of a reproduced signal obtained while an area contaminated with a fingerprint is scanned, a period during which the fingerprint affects the waveform occurs as schematically shown in FIG. 13A. This period will be referred to as "fingerprint period" hereinafter for the convenience of description. For the fingerprint period, the amplitude level decreases due to a reduction in the amount of reflected light. In addition, a center level of the amplitude varies. That is, an offset fluctuation occurs.

In this case, the offset canceller 81 including, for example, a high-pass filter removes a low frequency fluctuation to eliminate the offset of the center level as shown in FIG. 13B. Furthermore, the AGC circuit 82 performs amplitude adjustment (e.g., application of a gain according to an amplitude level) to obtain a reproduced signal waveform in which the influence of the fingerprint is eliminated as shown in FIG. 13C.

After the influence of the fingerprint is eliminated in the above-described manner, the decoder using, for example, PRML (Partial Response Maximum Likelihood) decodes the resultant signal to obtain a binary data sequence. After that, a decoding circuit (not shown) decodes the data sequence, encoded by run length limited encoding, and further performs error correction on the data sequence to obtain reproduced data.

A fluctuation of a signal, reproduced from a portion contaminated with a fingerprint, occurs in a higher frequency band than that in which a normal signal fluctuation is found within one rotation of an optical disk during reproducing (hereinafter, such a fluctuation will be referred to as "normal disk rotation fluctuation"). To improve resistance to a fingerprint in the circuitry shown in FIG. 11, therefore, the offset canceller 81 and the AGC circuit 82 are configured to function in a higher frequency band than that intended for a normal disk rotation fluctuation.

SUMMARY OF THE INVENTION

When the frequency band of the offset canceller 81 and the AGC circuit 82 is raised, the raised frequency band overlaps a frequency band for recording a signal onto a disk, resulting in distortion of reproduced signals including signals reproduced from an area that is not contaminated with a fingerprint. Unfortunately, the playability is degraded.

Actually, to effectively reduce fluctuation elements of a signal reproduced from a portion contaminated with a typical fingerprint during 1× speed playback of a Blu-ray Disc, it is necessary to set the upper limit of the frequency band of the offset canceller 81 and the AGC circuit 82 in the range from about 60 to about 600 kHz. However, the frequency band in this range overlaps the low frequency spectrum of a signal to be recorded using RLL (1, 7) PP modulation applied to Blu-ray Discs. FIG. 14 shows the frequency spectrum of a signal recorded using RLL (1, 7) PP modulation and a frequency band affected by a fingerprint as a disturbance. Referring to FIG. 14, the lower frequency side of the signal band overlaps the band of fluctuation elements caused by the fingerprint.

In the case where the upper limit of the frequency band of the offset canceller 81 and the AGC circuit 82 is set in the range from about 60 to about 600 kHz in order to reliably eliminate the influence of a fingerprint, the original elements of reproduced signals in this band are also modulated by the offset canceller 81 and the AGC circuit 82, thus resulting in a significant degradation in signal quality detected in an index of signal quality, such as jitter.

In other words, although the playability in an area contaminated with a fingerprint (hereinafter, "fingerprint area") is improved by the offset canceller 81 and the AGC circuit 82 functioning in a high frequency band, the playability in an area that is not contaminated with a fingerprint (hereinafter, "non-fingerprint area") is reduced.

In actual disk drives, therefore, it is difficult to raise the frequency band of the offset canceller 81 and the AGC circuit 82 to a frequency band providing the effect of sufficiently improving the playability in a fingerprint area. Accordingly, the frequency band of the offset canceller 81 and the AGC circuit 82 is set so that the degradation in reproduced signal quality is within permissible limits.

In other words, a function resistant to fingerprints is not sufficiently exhibited.

In particular, in high-recording-density disks, such as a Blu-ray Disc, a fingerprint affects a relatively wide range of data reproduction. Furthermore, since multilayer structures have been developed to increase the capacity, recording layers included in such disks are closer to the surfaces of the disks. This also enhances the influence of a fingerprint.

It is desirable to adequately eliminate the influence of a fingerprint without affecting signal quality.

According to an embodiment of the present invention, a reproducing apparatus includes the following elements. A reproducing head unit irradiates an optical disk with a laser beam to obtain a reproduced signal as a reflected light signal. An offset cancellation circuit cancels an offset element of the reproduced signal. An automatic gain control circuit adjusts the amplitude of the reproduced signal processed through the offset cancellation circuit. A band switching control unit detects a fingerprint period during which the reproduced signal is affected by a fingerprint on the surface of the optical disk and, for the fingerprint period, switches a frequency band in which the offset cancellation circuit and the automatic gain control circuit function to a higher frequency band than that associated with a non-fingerprint period. A decoding unit decodes the reproduced signal processed through the automatic gain control circuit to output binary data. A data reproduction processing unit performs data reproduction processing on the binary data output from the decoding unit to obtain reproduced data.

According to this embodiment, the band switching control unit may detect an amplitude envelope of the reproduced signal and compare the amplitude envelope with a predetermined threshold to detect the fingerprint period.

The band switching control unit may detect an offset fluctuation in center level of the reproduced signal and compare the offset level with a predetermined threshold to detect the fingerprint period.

The band switching control unit may detect an amplitude envelope of the reproduced signal and compare the amplitude envelope with first and second thresholds to detect the fingerprint period.

Preferably, the automatic gain control circuit includes a first automatic gain control circuit segment that functions in a normal frequency band associated with the non-fingerprint period and a second automatic gain control circuit segment that functions in a high frequency band associated with the fingerprint period, and the band switching control unit controls the second automatic gain control circuit segment to function only for the fingerprint period.

According to another embodiment of the present invention, there is provided a reproducing method for a reproducing apparatus including a reproducing head unit that irradiates an optical disk with a laser beam to obtain a reproduced signal as a reflected light signal, an offset cancellation circuit that cancels an offset element of the reproduced signal, an automatic gain control circuit that adjusts the amplitude of the reproduced signal processed through the offset cancellation circuit, a decoding unit that decodes the reproduced signal processed through the automatic gain control circuit to output binary data, and a data reproduction processing unit that performs data reproduction processing on the binary data output from the decoding unit to obtain reproduced data. The method includes the steps of detecting a fingerprint period during which the reproduced signal is affected by a fingerprint on the surface of the optical disk, and switching, for the fingerprint period, a frequency band in which the offset cancellation circuit and the automatic gain control circuit function to a higher frequency band than that associated with a non-fingerprint period to allow the offset cancellation circuit and the automatic gain control circuit to perform offset cancellation and amplitude adjustment.

According to any of the embodiments of the present invention, a period (fingerprint period) during which a reproduced signal is affected by a fingerprint is detected. For the fingerprint period, a frequency band in which the offset cancellation circuit and the automatic gain control circuit function is switched to a higher frequency band than that associated with a non-fingerprint period. For example, the upper limit of a frequency band is set in the range from about 60 to about 600 kHz. In other words, offset cancellation and amplitude adjustment are performed in a frequency band in which an amplitude fluctuation and an offset fluctuation caused by a fingerprint can be appropriately removed. On the other hand, for a non-fingerprint period, a normal frequency band in which an amplitude fluctuation or an offset element caused by, for example, a disk rotation fluctuation can be appropriately removed, namely, a frequency band upper limit is set to about 15 kHz. Consequently, the influence of the fingerprint can be reliably eliminated only for the fingerprint period such that the elements of reproduced signals are not affected by the offset cancellation operation and the AGC operation for the non-fingerprint period.

As for detection of a fingerprint period from reproduced signals, an amplitude fluctuation or an offset fluctuation of a reproduced signal caused by the influence of a fingerprint may be detected.

According to any of the embodiments of the present invention, a reproduced signal is subjected to offset cancellation and AGC processing in a high frequency band only for a period during which the reproduced signal is affected by a fingerprint. Consequently, a fluctuation in the amplitude of the reproduced signal or a disturbance on the asymmetry thereof can be favorably corrected. In addition, since offset cancellation and AGC processing in the high frequency band are not performed for a non-fingerprint period, offset cancellation and AGC processing do not adversely affect the elements of a reproduced signal.

Advantageously, resistance to a fingerprint is increased, thus remarkably improving playability.

BRIEF DESCRIPTION OF THE DRAWINGS

FIG. 4 is a diagram showing an example of error rate inspection in accordance with the embodiment;

FIG. 6 is a block diagram illustrating the data signal processing unit in accordance with another embodiment of the present invention;

DESCRIPTION OF THE PREFERRED EMBODIMENTS

Embodiments of the present invention will be described in the following order:

1. Structure of Disk Drive;
2. Structure and Operation for Dealing with Fingerprint According to First Embodiment;
3. Structure and Operation for Dealing with Fingerprint According to Second Embodiment;
4. Structure and Operation for Dealing with Fingerprint According to Third Embodiment;
5. Structure and Operation for Dealing with Fingerprint According to Fourth Embodiment; and
6. Advantages of Embodiments.

1. Structure of Disk Drive

A disk drive according to an implementation of the present invention is capable of reproducing data from a read-only memory (ROM) disk and recording data onto a writable disk, such as a write-once disk or a rewritable disk, those disks corresponding to, for example, Blu-ray Discs.

As for the writable disk, data is recorded and reproduced as phase-change marks or dye-change marks on the condition that a laser having a wavelength of 405 nm (i.e., blue laser) and an objective lens having a numerical aperture (NA) of 0.85 are used in combination. Data is recorded and reproduced with a track pitch of 0.32 μm at a linear density of 0.12 μm/bit such that a data block of 64 KB (kilobyte) is used as a recording/reproducing unit block (RUB).

As for the ROM disk, data for read-only purposes is recorded as emboss pits having a depth of about λ/4. Similarly, the track pitch is 0.32 μm, the linear density is 0.12 μm/bit, and a data block of 64 KB is used as a single RUB.

An RUB, serving as a recording/reproducing unit block, includes 498 frames obtained by adding a link area of one frame to, for example, each of both sides of an ECC block (cluster) having 156 symbols×496 frames.

As for the writable disk, a groove is formed while wobbling on the disk. The wobbling groove serves as recording/reproducing tracks. The wobbling of the groove contains ADIP (Address in Pregroove) data. In other words, wobbling information in the groove is detected, thereby obtaining an address on the disk.

In the writable disk, recording marks are provided as phase-change marks on the tracks including the wobbling groove. The phase-change marks are recorded with a linear density of 0.12 μm/bit, or 0.08 μm/ch bit by RLL (1,7) PP modulation (RLL: Run Length Limited, PP: Parity preserve/ Prohibit rmtr (repeated minimum transition runlength)).

When let T denote a channel clock period, the length of a mark ranges from 2T to 8T.

As for the ROM disk, although any groove is not formed, data similarly subjected to RLL (1, 7) PP modulation is recorded as an emboss pit sequence.

Figure 1:
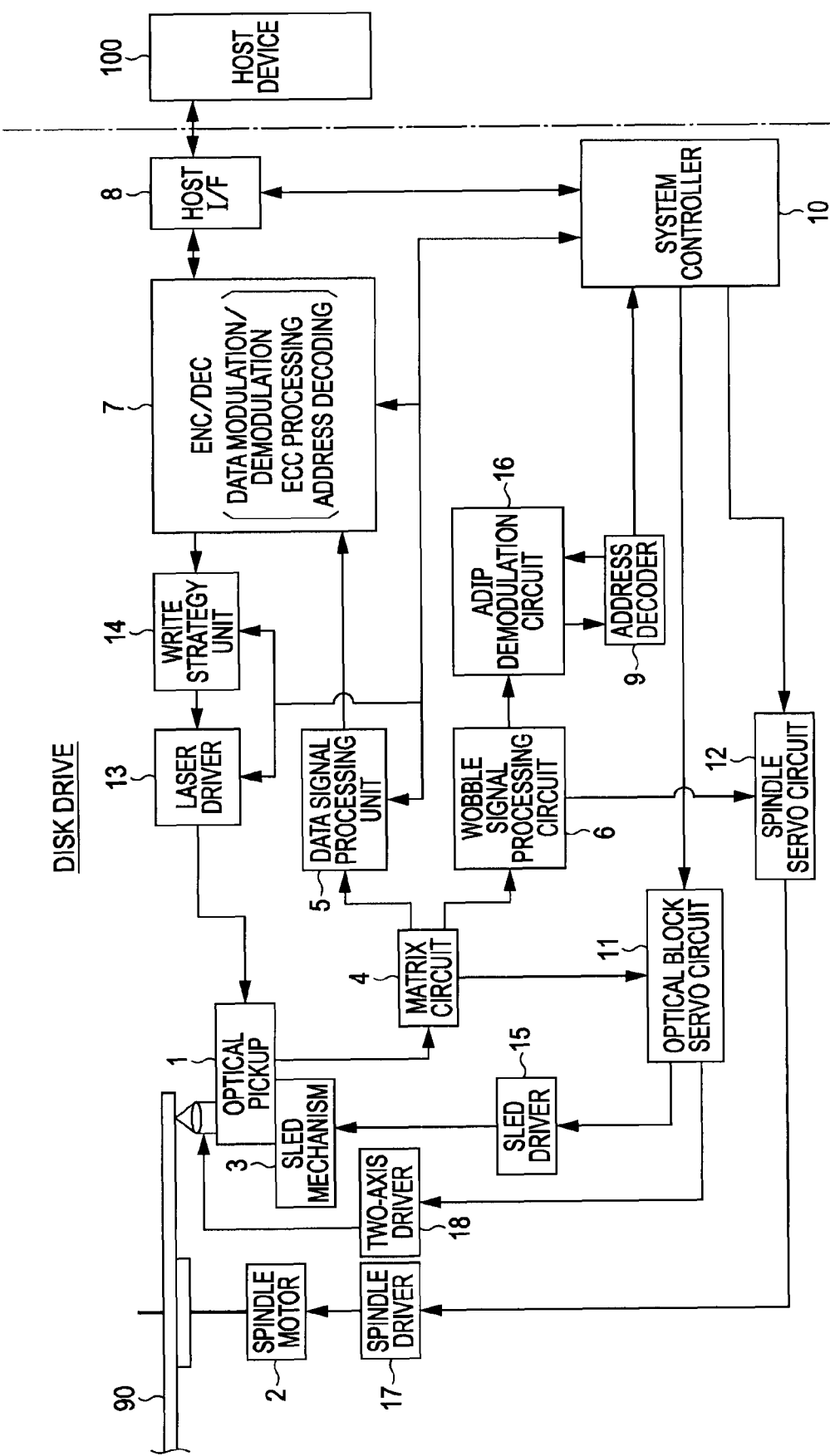
FIG. 1 is a block diagram of a disk drive according to an implementation of the present invention.

FIG. 1 illustrates the disk drive capable of recording and reproducing data onto/from such a disk.

A disk 90 is a read-only memory disk or a writable disk according to, for example, the above-described Blu-ray Disc standard.

After being loaded into the disk drive, the disk 90 is mounted on a turn table (not shown) and is rotated by a spindle motor 2 at a constant linear velocity (CLV) during recording and/or reproducing operation.

During reproducing, an optical pickup (optical head) 1 reads information corresponding to marks (pits) formed in tracks on the disk 90.

In the case where the disk 90 is of the writable type, the optical pickup 1 writes user data as phase-change marks or dye-change marks to the tracks on the disk 90 during recording.

In addition, management information for read-only purposes, e.g., physical information regarding the disk is recorded onto the disk 90 using emboss pits or a wobbling groove. The optical pickup 1 also reads the above information. In the case where the disk 90 is of the writable type, the optical pickup 1 also reads ADIP information embedded as the wobbling of the groove serving as the tracks on the disk 90.

The optical pickup 1 includes a laser diode, functioning as a laser source, a photodetector that detects reflected light, an objective lens that emits a laser beam, and an optical system that applies the laser beam through the objective lens to a recording surface of the disk and guides reflected light from the disk to the photodetector. The laser diode emits a blue laser beam having a wavelength of, for example, 405 nm. The optical system has an NA of 0.85.

In the optical pickup 1, the objective lens is held movably in the tracking direction and the focusing direction by a two-axis mechanism.

The entire optical pickup 1 is movable in the disk radial direction by a sled mechanism 3.

The laser diode in the optical pickup 1 is driven so as to emit a laser beam in accordance with a drive signal (drive current) supplied from a laser driver 13.

The photodetector detects information contained in light reflected from the disk 90 and supplies the information as an electrical signal corresponding to the amount of detected light to a matrix circuit 4.

The matrix circuit 4 includes current-voltage conversion circuits for currents output from a plurality of photodetecting elements constituting the photodetector and a matrix arithmetic and amplifier circuit, and generates a signal necessary for matrix arithmetic operation.

For example, the matrix circuit 4 generates a radio frequency (RF) signal (reproduced signal) corresponding to reproduced data and also generates a focusing error signal and a tracking error signal for servo control.

The matrix circuit 4 further generates a push-pull signal as a signal related to wobbling of the groove, namely, a signal for detecting the wobbling.

The reproduced signal (RF signal) output from the matrix circuit 4 is supplied to a data signal processing unit 5, the focusing error signal and the tracking error signal are supplied to an optical block servo circuit 11, and the push-pull signal is supplied to a wobble signal processing circuit 6.

The data signal processing unit 5 binarizes the reproduced signal.

For example, the data signal processing unit 5 includes a decoder that performs A/D conversion, reproduced clock generation using a PLL, partial response (PR) equalization, and Viterbi decoding (maximum likelihood decoding) on the RF signal. The data signal processing unit 5 performs partial response maximum likelihood decoding (PRML detection) on the reproduced signal to obtain a binary data sequence.

Figure 2:
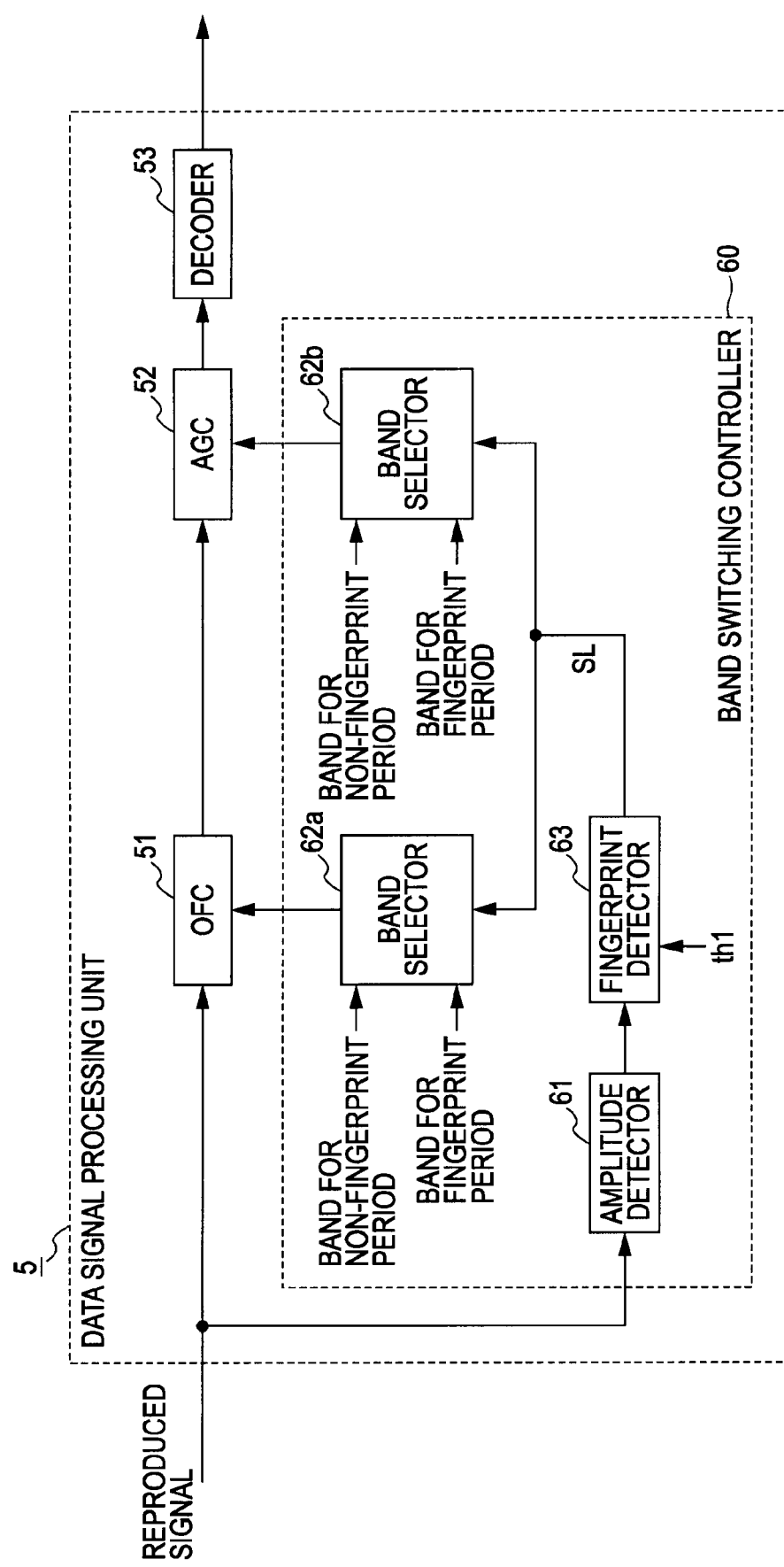
FIG. 2 is a block diagram illustrating the structure of a data signal processing unit in accordance with an embodiment of the present invention.

In this embodiment, the data signal processing unit 5 has a structure as shown in, for example, FIG. 2. The data signal processing unit 5 includes a section for offset adjustment on a reproduced signal and a section for amplitude adjustment on the reproduced signal upstream of a decoder 53 that performs the above-described partial response maximum likelihood decoding. The structure in FIG. 2 will be described in detail below.

Partial response maximum likelihood decoding will now be described in brief. Recently, partial response maximum likelihood detection has been widely used as a method for reproducing data from an optical disk. According to this method, a partial response sequence providing the minimum Euclidean distance between signals read from a disk is detected. Partial response maximum likelihood detection is a technique obtained by combining a process of partial response and a process of maximum likelihood detection.

A partial response sequence is obtained by adding a weight defined by a target response to a bit sequence. In an optical disk system, for example, PR (1, 2, 2, 1) is used. This means that a value obtained by assigning weights of 1, 2, 2, 1 to a bit sequence and adding the weighted values is returned as a partial response value.

Partial response is a process of returning an output longer than one bit in response to a one-bit input. A process of multiplying four consecutive bits of input information by, in sequence, 1, 2, 2, 1 and adding the resultant values to obtain a reproduced signal is expressed as the above-described PR (1, 2, 2, 1).

Maximum likelihood detection is a process of defining the distance, called "Euclidean distance", between two signals, determining the distance between an actual signal and a signal expected from an assumed bit sequence, and detecting a bit sequence providing the minimum distance. The Euclidean distance is defined as a distance obtained as the sum of the squares of the amplitude differences at all time points, the difference in amplitude between two signals being obtained at each time point. Viterbi detection is used to search for a bit sequence providing the minimum Euclidean distance.

According to partial response likelihood detection obtained by combining those processes, a signal obtained from bit information recorded on a recording medium is adjusted so as to express a partial response process by a filter called an "equalizer", the Euclidean distance between an obtained reproduced signal and a partial response of an assumed bit sequence is determined, and a bit sequence providing the minimum Euclidean distance is detected.

An algorithm based on the above-described Viterbi detection is effective in actually searching for a bit sequence providing the minimum Euclidean distance.

Viterbi detection uses a Viterbi detector that includes a plurality of states, including a predetermined length of consecutive bits as a unit, and branches represented by transitions between those states. The Viterbi detector is configured to efficiently detect a desired bit sequence from among all of available bit sequences.

The data signal processing unit 5 generates a binary data sequence as information read from the disk 90 using the above-described partial response maximum likelihood detection and then supplies the data sequence to an encoding/decoding unit 7 arranged downstream of the data signal processing unit 5.

The encoding/decoding unit 7 demodulates reproduced data during reproducing and modulates recording data during recording. Specifically, the encoding/decoding unit 7 performs data demodulation, deinterleaving, ECC decoding, and address decoding during reproducing and also performs ECC encoding, interleaving, and data modulation during recording.

During reproducing, a binary data sequence decoded by the data signal processing unit 5 is supplied to the encoding/decoding unit 7. The encoding/decoding unit 7 demodulates the binary data sequence to obtain data reproduced from the recording medium. In other words, the encoding/decoding unit 7 performs demodulation and ECC decoding for error correction on data subjected to RLL (1, 7) PP modulation and recorded on the disk 90, thus obtaining reproduced data from the disk 90.

The reproduced data decoded by the encoding/decoding unit 7 is transferred to a host interface 8 and is then transmitted to a host device 100 in accordance with an instruction from a system controller 10. The host device 100 includes, for example, a computer or an audio-visual (AV) system.

In the case where the disk 90 is of the writable type, the disk 90 is subjected to ADIP information processing during recording and reproducing.

Specifically, a push-pull signal, serving as a signal related to wobbling of the groove, output from the matrix circuit 4 is converted into digital wobble data by the wobble signal processing circuit 6. In addition, a clock synchronized with the push-pull signal is generated by PLL processing.

The wobble data is demodulated into a data stream containing an ADIP address by MSK demodulation or STW demodulation through an ADIP demodulation circuit 16. The data stream is supplied to an address decoder 9.

The address decoder 9 decodes input data to obtain an address value and then supplies the decoded data to the system controller 10.

During recording, recording data is transmitted from the host device 100. The recording data is supplied through the host interface 8 to the encoding/decoding unit 7.

In this case, the encoding/decoding unit 7 performs error correction code addition (ECC encoding), interleaving, and subcode addition on the recording data to encode the data. The encoding/decoding unit 7 further performs RLL (1, 7) PP modulation on the resultant data.

The recording data processed by the encoding/decoding unit 7 is supplied to a write strategy unit 14. The write strategy unit 14 performs recording compensation processing, e.g., fine adjustment of the optimum recording power with consideration given to the characteristics of recording layers, the shape of a laser beam spot, and recording linear velocity and adjustment of the waveform of a laser drive pulse, on the recording data and supplies the resultant data as laser drive pulses to the laser driver 13.

The laser driver 13 supplies the laser drive pulses subjected to the recording compensation processing to the laser diode in the optical pickup 1 to allow the laser diode to emit a laser beam. Consequently, marks corresponding to the recording data are formed in the disk 90.

The laser driver 13 includes a so-called auto power control (APC) circuit to keep a laser output level constant regardless of temperature while monitoring the power of laser output on the basis of an output from a detector, arranged in the optical pickup 1, for monitoring the laser power. The system controller 10 provides laser output target values for recording and reproducing to the laser driver 13. The laser driver 13 controls the laser output power so that a laser output level reaches the target value during each of the recording operation and the reproducing operation.

The optical block servo circuit 11 generates various servo drive signals for focusing, tracking and sled on the basis of a focusing error signal and a tracking error signal supplied from the matrix circuit 4, thus allowing for a servo operation.

Specifically, the optical block servo circuit 11 generates a focusing drive signal and a tracking drive signal in response to a focusing error signal and a tracking error signal to allow a two-axis driver 18 to drive a focusing coil and a tracking coil of the two-axis mechanism in the optical pickup 1. Consequently, the optical pickup 1, the matrix circuit 4, the optical block servo circuit 11, the two-axis driver 18, and the two-axis mechanism constitute a tracking servo loop and a focusing servo loop.

In addition, the optical block servo circuit 11 turns off the tracking servo loop in accordance with a track jump instruction from the system controller 10 and outputs a jump drive signal, thus allowing for a track jump operation.

Furthermore, the optical block servo circuit 11 generates a sled drive signal on the basis of a sled error signal obtained as a low frequency element of a tracking error signal or an access execution control signal from the system controller 10, thus allowing a sled driver 15 to drive the sled mechanism 3. The sled mechanism 3 includes a main shaft that holds the optical pickup 1, a sled motor, and a transfer gear, those elements being not shown in FIG. 1. The sled mechanism 3 drives the sled motor in response to a sled drive signal so that desired slide movement of the optical pickup 1 is achieved.

A spindle servo circuit 12 controls the spindle motor 2 to perform CLV rotation.

The spindle servo circuit 12 obtains a clock, generated by PLL processing on a wobble signal, as information indicating the current rotational speed of the spindle motor 2 and compares the obtained information with predetermined CLV reference speed information to generate a spindle error signal.

During reproducing data, a reproduced clock, generated by the PLL in the data signal processing unit 5, serves as information indicating the current rotational speed of the spindle motor 2. Accordingly, the spindle servo circuit 12 may compare the rotational speed information with the predetermined CLV reference speed information to generate a spindle error signal.

The spindle servo circuit 12 outputs a spindle drive signal generated on the basis of the spindle error signal, thus allowing a spindle driver 17 to perform CLV rotation of the spindle motor 2.

In addition, the spindle servo circuit 12 generates a spindle drive signal in response to a spindle kick/brake control signal supplied from the system controller 10, thus allowing for an operation of actuating, stopping, accelerating, or decelerating the spindle motor 2.

The above-described various operations of a servo system and a recording/reproducing system are controlled by the system controller 10 including a microcomputer.

The system controller 10 performs various processes in accordance with commands supplied from the host device 100 through the host interface 8.

For example, when receiving a write command output from the host device 100, the system controller 10 moves the optical pickup 1 to a target address where data is to be written. The system controller 10 allows the encoding/decoding unit 7 to encode data (e.g., video data and/or audio data) transmitted from the host device 100 as described above. Consequently, the laser driver 13 allows for laser emission according to the encoded data, thus carrying out recording.

For example, when receiving a read command for transferring any data recorded on the disk 90 from the host device 100, the system controller 10 performs an operation for seeking a designated address. Specifically, the system controller 10 outputs an instruction to the optical block servo circuit 11, so that the optical pickup 1 is allowed to access a target address designated by a seek command.

After that, the system controller 10 performs control necessary for transferring data in the designated data zone to the host device 100. Specifically, the system controller 10 allows for reading of data from the disk 90, reproducing processing in the data signal processing unit 5 and the encoding/decoding unit 7, and transfer of requested data to the host device 100.

In the implementation shown in FIG. 1, the disk drive connected to the host device 100 has been described as an example. The disk drive according to the implementation of the present invention is not limited to this example and may not necessarily be connected to another device. In this case, the structure of the interface for data input and output differs from that shown in FIG. 1. For example, the disk drive may include an operation unit and a display unit. In other words, the disk drive may include a terminal unit for input and output of various pieces of data so that recording and reproducing can be performed in accordance with a user operation.

Other various structures can be applied to the disk drive. For example, the disk drive may be a playback-only device.

2. Structure and Operation for Dealing with Fingerprint According to First Embodiment Assuming that the present invention is applied to such a disk drive, the characteristic structure and operation of a disk drive according to an embodiment of the present invention will be described below. Specifically, the structure and operation for appropriately dealing with the influence of a fingerprint on the disk 90 in accordance with a first embodiment will now be described.

According to this embodiment, the data signal processing unit 5 in FIG. 1 has a structure shown in FIG. 2. Referring to FIG. 2, the data signal processing unit 5 includes an offset canceller 51, an AGC circuit 52, the decoder 53, and a band switching controller 60.

The decoder 53 is a section for performing partial response maximum likelihood decoding as described above. The decoder 53 performs A/D conversion, reproduced clock generation using the PLL, PR equalization, and Viterbi decoding on a reproduced signal (analog RF signal) supplied from the AGC circuit 52 to obtain a binary data sequence.

The offset canceller 51 for offset cancellation on the reproduced signal and the AGC circuit 52 for amplitude adjustment thereon are disposed upstream of the decoder 53.

Figure 13A:
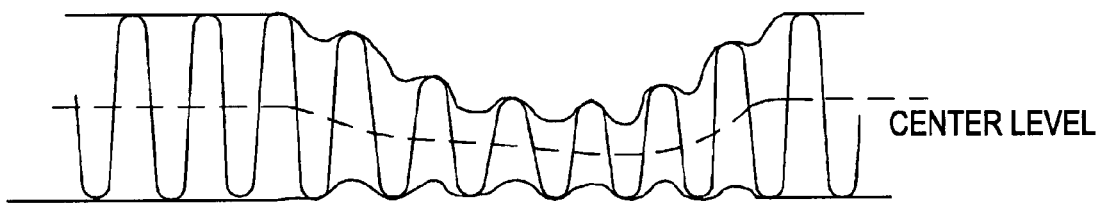
FIGS. 13A to 13C are diagrams explaining offset cancellation and AGC processing.
Figure 13B:
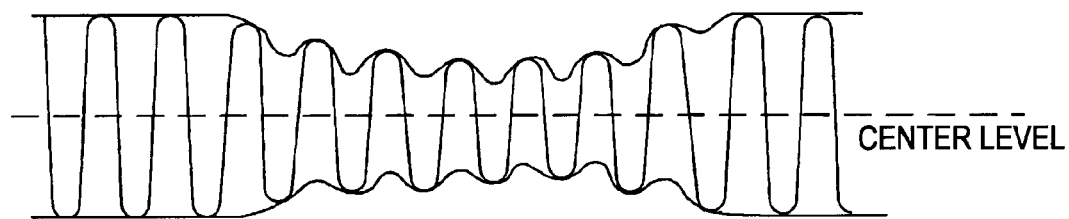
Figure 13C:
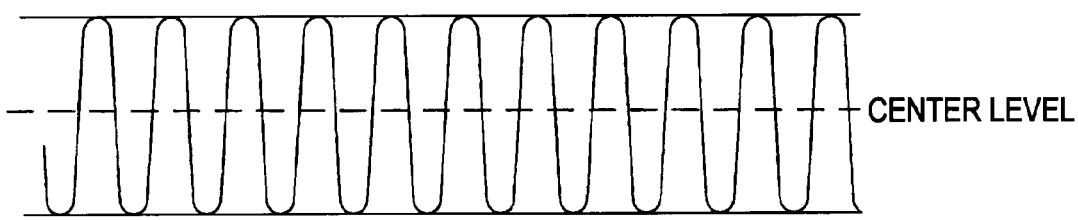

The offset canceller 51, including a high-pass filter, removes a fluctuation element (offset) in the center level of the reproduced signal as described with reference to FIGS. 13A and 13B. The AGC circuit 52 performs amplitude adjustment (application of a gain according to an amplitude level) as described with reference to FIGS. 13B and 13C to obtain a reproduced signal waveform in which the influence of a fingerprint is eliminated.

The offset canceller 51 and the AGC circuit 52 also remove a fluctuation in amplitude of a reproduced signal occurring in the rotation period of the disk 90 and fluctuations caused by various external disturbances in addition to a fluctuation caused by the influence of a fingerprint.

As described above, a fluctuation of a reproduced signal in an area contaminated with a fingerprint (i.e., a fingerprint area) on the disk 90 occurs in a higher frequency band than that associated with a normal signal fluctuation found within one rotation of an optical disk during reproducing, namely, a normal disk rotation fluctuation. To improve resistance to fingerprints, therefore, the offset canceller 51 and the AGC circuit 52 have to be configured to function in a higher frequency band than that dealing with a normal disk rotation fluctuation.

Figure 14:
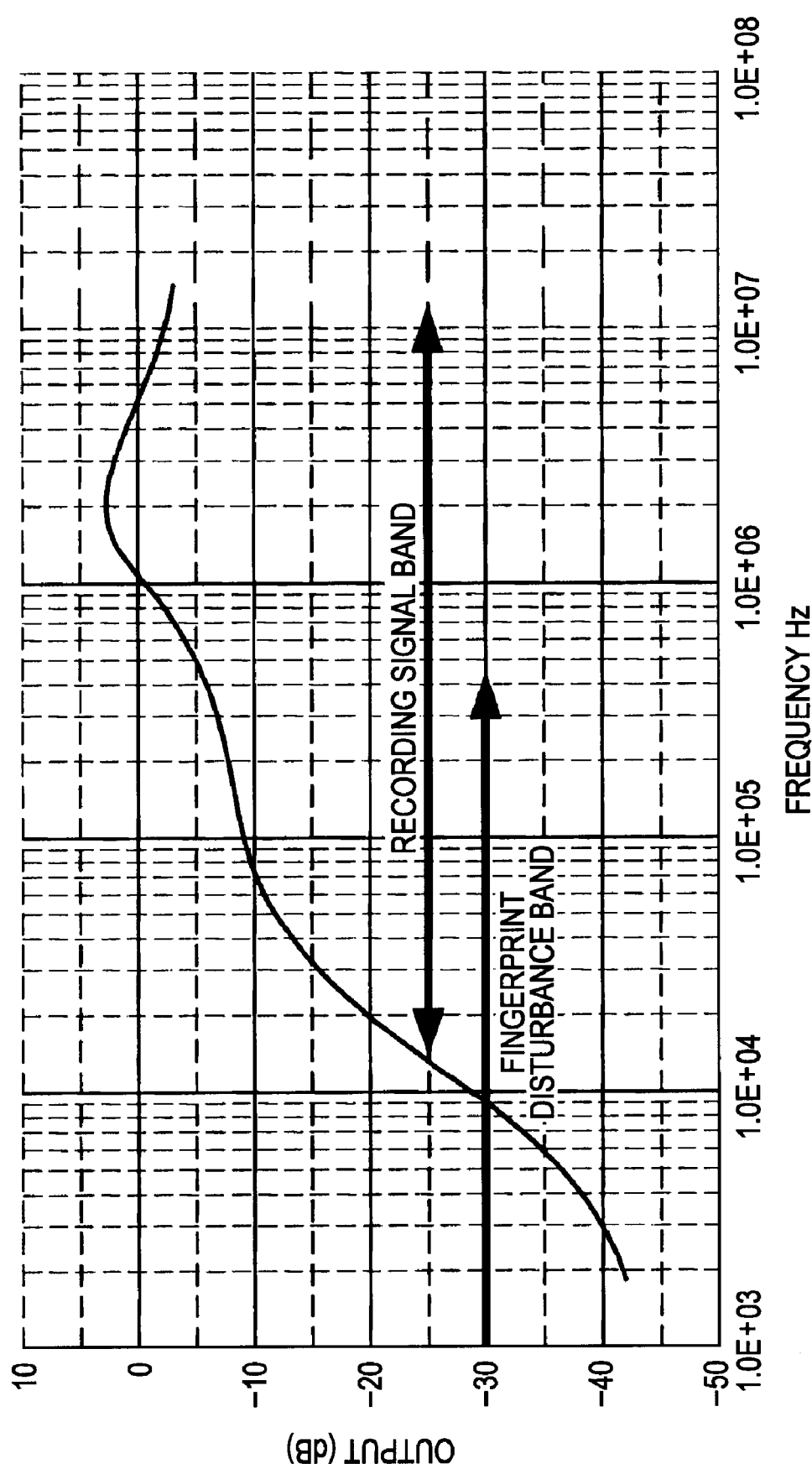
FIG. 14 is a diagram explaining a fingerprint disturbance band and a recording signal band.

However, when the frequency band of the offset canceller 51 and the AGC circuit 52 is raised too high, the raised frequency band overlaps a frequency band for information signals (recording signals) read from the disk 90 (refer to FIG. 14), thus distorting recording signal elements. This leads to degraded playability.

According to this embodiment, the band switching controller 60 performs frequency-band switching control to switch the frequency band in which the offset canceller 51 and the AGC circuit 52 function.

Specifically, a period (fingerprint period) during which a fingerprint affects a reproduced signal is detected and a frequency band associated with a non-fingerprint period is switched to that associated with the fingerprint period.

The band switching controller 60 includes an amplitude detector 61, band selectors 62a and 62b, and a fingerprint detector 63.

The amplitude detector 61 performs envelope detection on reproduced signals. For example, the amplitude detector 61 has a structure for performing peak-hold processing and bandpass filter processing using a pass band ranging from 60 to 600 kHz on reproduced signals to detect an envelope as an amplitude fluctuation element affected by a fingerprint.

The fingerprint detector 63 compares the detected envelope with a predetermined threshold th1 to detect a fingerprint period.

Figure 3A:
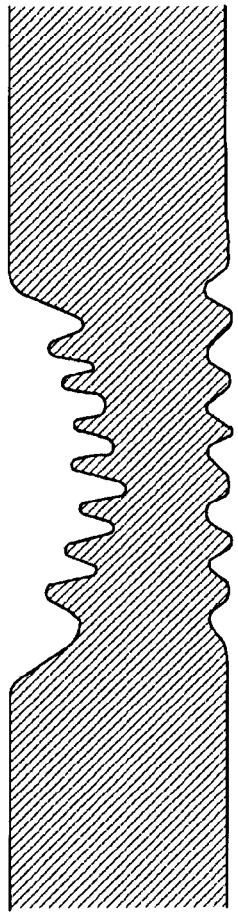
FIGS. 3A to 3C are diagrams explaining an operation for detecting a fingerprint period in accordance with the embodiment.
Figure 3B:
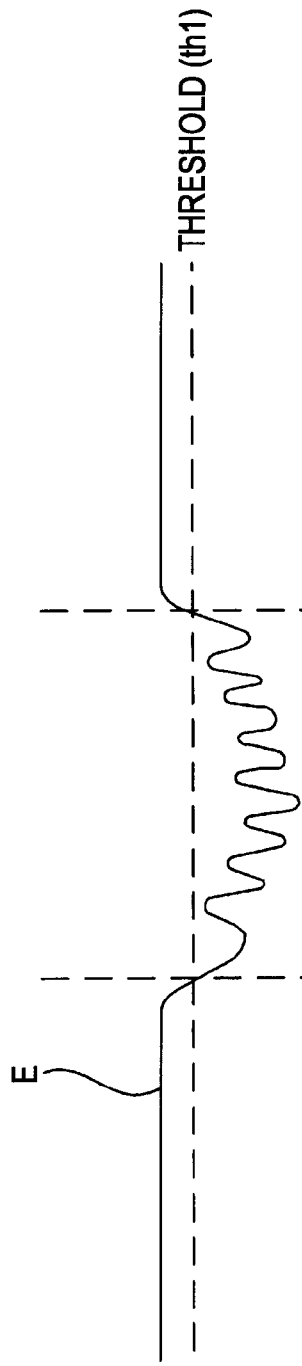
Figure 3C:
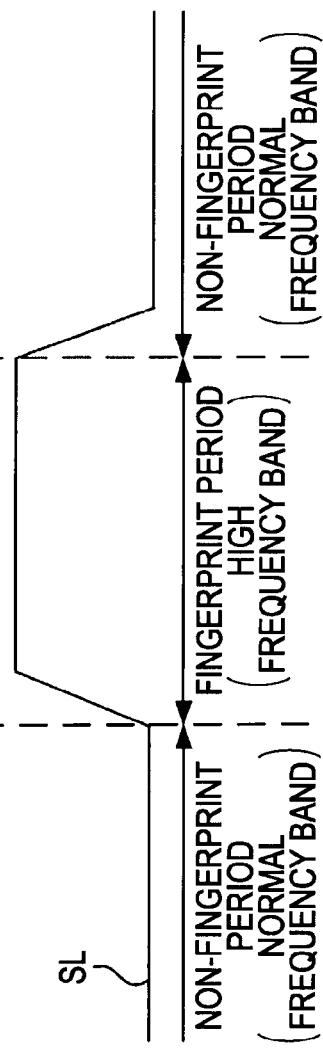

In a portion contaminated with a fingerprint on the disk 90, reflected light is scattered by the fingerprint. Accordingly, the amplitude of a reproduced signal decreases. For example, as schematically shown in FIG. 3A, the amplitude level of the reproduced signal temporarily decreases. Such an amplitude envelope E of the reproduced signal is detected by the amplitude detector 61 and the envelope E is compared to the threshold th1 by the fingerprint detector 63 as shown in FIG. 3B, thus obtaining a signal indicating the result of comparison (hereinafter, "comparison result signal") as shown in FIG. 3C. The comparison result signal is a signal indicating that the fingerprint period is detected (hereinafter, "fingerprint-period detection signal"). The fingerprint detector 63 supplies the fingerprint-period detection signal as a band selection signal SL to each of the band selectors 62a and 62b.

In the band selectors 62a and 62b, information regarding a frequency band associated with a fingerprint period and information regarding a frequency band associated with a non-fingerprint period are set by, for example, the system controller 10.

For example, a frequency band of 15 kHz or less is set for the non-fingerprint period and a frequency band of 100 kHz or less is set for the fingerprint period. In the frequency band for the fingerprint period, a cutoff frequency as an upper limit is preferably set in the range from 60 to 600 kHz.

The band selector 62a performs band switching control on the offset canceller 51 and the band selector 62b performs band switching control on the AGC circuit 52. The band selectors 62a and 62b each perform the control operation on the basis of the band selection signal SL supplied form the fingerprint detector 63.

Specifically, when the band selection signal SL indicates a non-fingerprint period, the band selectors 62a and 62b instruct the offset canceller 51 and the AGC circuit 52 to operate in a frequency band of 15 kHz or less. Whereas, when the band selection signal SL indicates a fingerprint period, the band selectors 62a and 62b instruct the offset canceller 51 and the AGC circuit 52 to operate in a frequency band of 100 kHz or less.

For a fingerprint period during which a reproduced signal is affected by a fingerprint, therefore, the operating frequency band of the offset canceller 51 and the AGC circuit 52 is raised to a high frequency band of, for example, 100 kHz or less. Consequently, an abrupt offset fluctuation and a fluctuation in the amplitude of the reproduced signal caused by the fingerprint is compensated for and the resultant reproduced signal is supplied to the decoder 53 in the subsequent stage.

Whereas, for a non-fingerprint period during which a reproduced signal is not affected by a fingerprint, the operating frequency band of the offset canceller 51 and the AGC circuit 52 is set to a normal frequency band of, for example, 15 kHz or less so that an offset fluctuation or an amplitude fluctuation in a relatively low frequency band caused by, for example, a disk rotation fluctuation is compensated for. In this case, the elements of a recording signal read from the disk 90 are not affected by processing through the offset canceller 51 and the AGC circuit 52. Accordingly, the signal quality is not degraded.

According to this embodiment, the above-described operation achieves the decoding capability ever provided in an area uncontaminated with any fingerprint (i.e., a non-fingerprint area) and a reduction of a burst error in a fingerprint area, thus improving the total playability.

FIG. 4 shows the results of experiments including experiments to which the above-described embodiment was applied.

In those experiments, data was continuously recorded onto areas including a fingerprint area on the disk 90 and was reproduced to measure symbol error rates. FIG. 4 shows the error rate plotted against the address on the disk. The symbol error rates were measured in respective ECC blocks arranged in the order of address.

Figure 11:
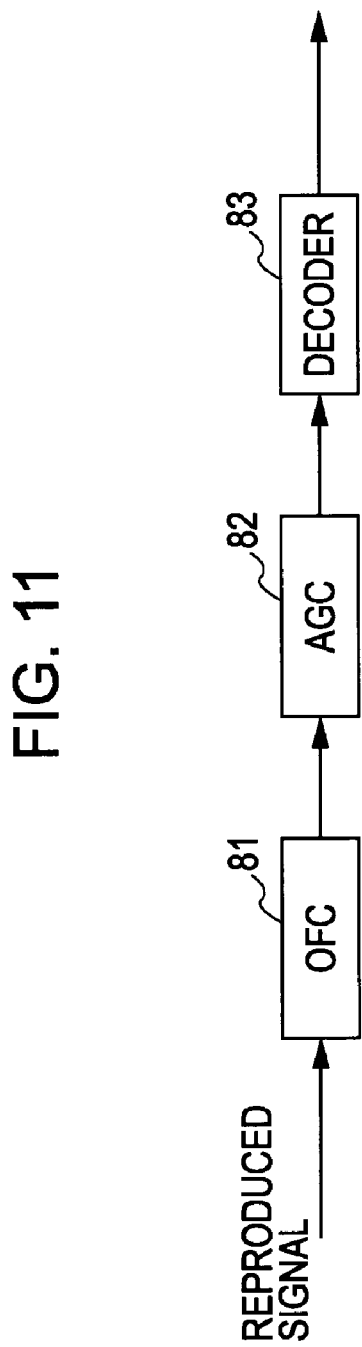
FIG. 11 is a block diagram illustrating a related-art system for processing a reproduced signal.
Figure 12A:
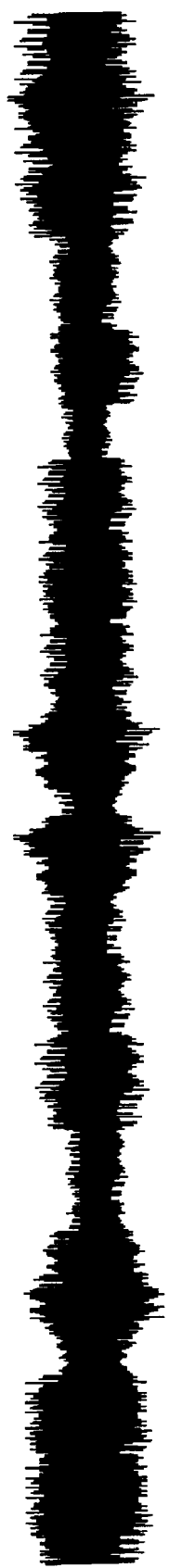
FIGS. 12A and 12B are diagrams explaining the waveform of a reproduced signal affected by a fingerprint.
Figure 12B:

Each mark "○" denotes the result of experiment to which the circuitry according to this embodiment was applied. Each mark "♦" denotes the result of experiment to which related-art circuitry having a structure shown in, for example, FIG. 11 was applied. In the related-art circuitry, offset cancellation and AGC processing are performed in a normal frequency band (of, for example, about 15 kHz).

The marks "○" and "♦" each denote an error rate in a single ECC block.

In the related-art circuitry, since offset cancellation and AGC processing are performed in a frequency band of about 15 kHz, the influence of a fingerprint is not cancelled. Accordingly, the symbol error rates in the fingerprint area were degraded to about criteria ($4 \times 10^{-3}$) shown by a dash line.

In the circuitry according to the embodiment, it is recognized that the symbol error rates in the fingerprint area were improved by about one order of magnitude better than those in the related art (the marks "○" distributed in and near the range from 1.0E-03 to 1.0E-04 denote the error rates of ECC blocks in the fingerprint area).

In other words, it is recognized that the playability in the fingerprint area was reliably improved in accordance with this embodiment.

Figure 5:
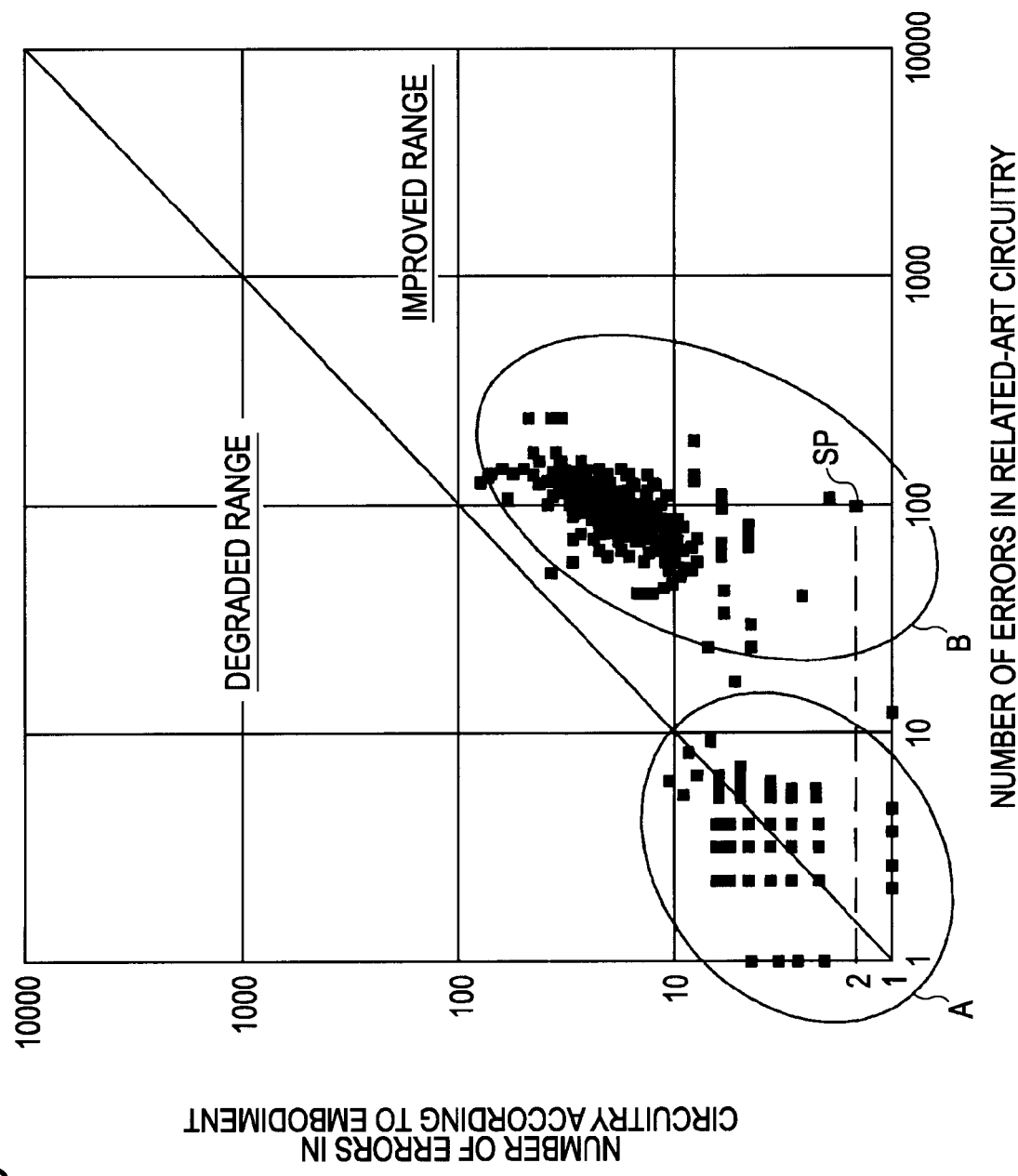
FIG. 5 is a diagram explaining an improved effect in accordance with the embodiment.

FIG. 5 shows the results of comparison between the counted number of symbol errors in the related-art circuitry and that in the circuitry according to this embodiment in each address on the disk.

FIG. 5 shows the counted number of errors in the circuitry according to this embodiment plotted against that in the related-art circuitry. As for an ECC block address corresponding to, for example, a sample SP, the counted number of errors in the related-art circuitry is 100 and that according to the embodiment is 2. Accordingly, samples located in the range on the lower right side of the diagonal line in FIG. 5 denote improvements according to this embodiment and samples located in the range on the upper left side of the diagonal line denote samples in which the counted numbers of errors were increased according to this embodiment.

In this case, samples included in a region A (a group of samples in each of which the counted number of symbol errors is less than 10) each indicate the counted number of errors, e.g., random errors in the ECC blocks in the non-fingerprint area. There is not much difference in error-reduction effect between the related-art circuitry and the circuitry according to this embodiment. For a non-fingerprint period related to reproduced signals corresponding to the non-fingerprint area, the operating frequency band of the offset canceller 51 and the AGC circuit 52 in the circuitry according to this embodiment is set to about 15 kHz. Accordingly, offset cancellation and AGC processing in the circuitry according to this embodiment are substantially the same as those in the related-art circuit.

On the other hand, samples included in a region B each indicate the counted number of errors, such as burst errors caused by a fingerprint, in ECC blocks in the fingerprint area. It is found that the counted numbers of errors in the circuitry, in which the operating frequency of the offset canceller 51 and the AGC circuit 52 is set to about 100 kHz, according to this embodiment were remarkably reduced as compared with those in the related-art circuitry.

In other words, it is understood from FIG. 5 that the circuitry according to this embodiment improves the playability in the fingerprint area without degrading the playability in the non-fingerprint area.

In the operation according to this embodiment, the operating frequency band of the offset canceller 51 and the AGC circuit 52 is raised to a higher frequency band in a fingerprint area on an optical disk. This means that even when a fingerprint affects a data unit smaller than an ECC block unit, serving as a unit subjected to error correction, the influence of the fingerprint can be dealt with.

3. Structure and Operation for Dealing with Fingerprint According to Second Embodiment The structure and operation according to a second embodiment of the present invention will now be described.

FIG. 6 illustrates the internal structure of the data signal processing unit 5 in accordance with this embodiment in a manner similar to FIG. 2. In the data signal processing unit 5 according to this embodiment shown in FIG. 6, the band switching controller 60 includes an offset fluctuation detector 64 instead of the amplitude detector 61 in FIG. 2. The other elements of the amplitude detector 61, i.e., the fingerprint detector 63 and the band selectors 62*a* and 62*b* are the same as those in the first embodiment shown in FIG. 2.

In this embodiment, the offset fluctuation detector 64 detects an offset fluctuation element from a reproduced signal. Specifically, the offset fluctuation detector 64 includes a bandpass filter having a pass band ranging, for example, from 60 to 600 kHz.

Figure 7A:
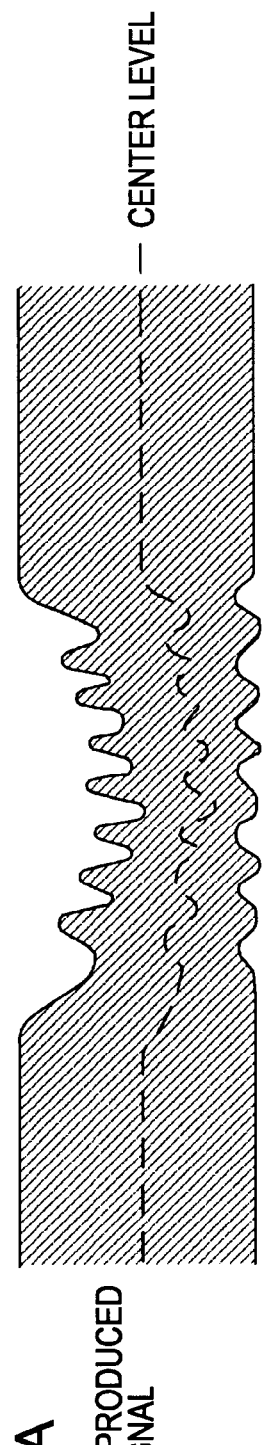
FIGS. 7A to 7C are diagrams explaining an operation for detecting a fingerprint period in accordance with the embodiment.

The offset fluctuation detector 64 performs bandpass filtering to detect an offset fluctuation element from a reproduced signal as shown in, for example, FIG. 7A, namely, a fluctuation in center level waveform CL.

The fingerprint detector 63 compares the detected center level waveform CL with a predetermined threshold th3 to detect a fingerprint period.

Figure 7B:
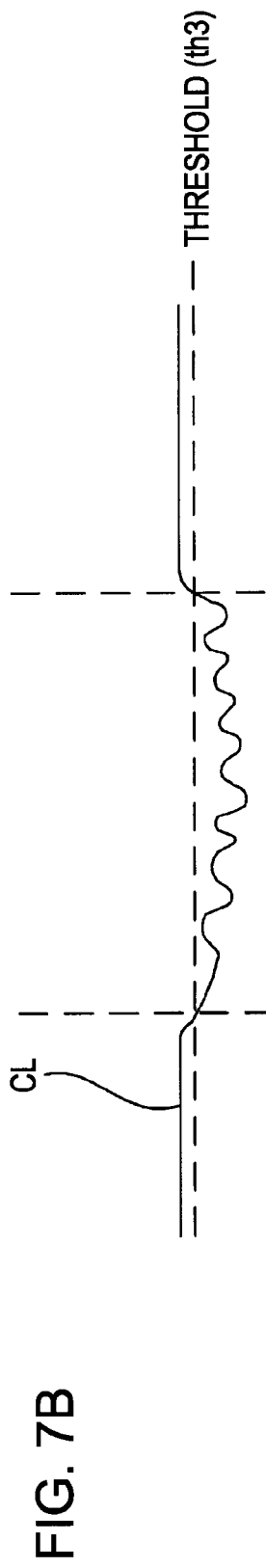
Figure 7C:
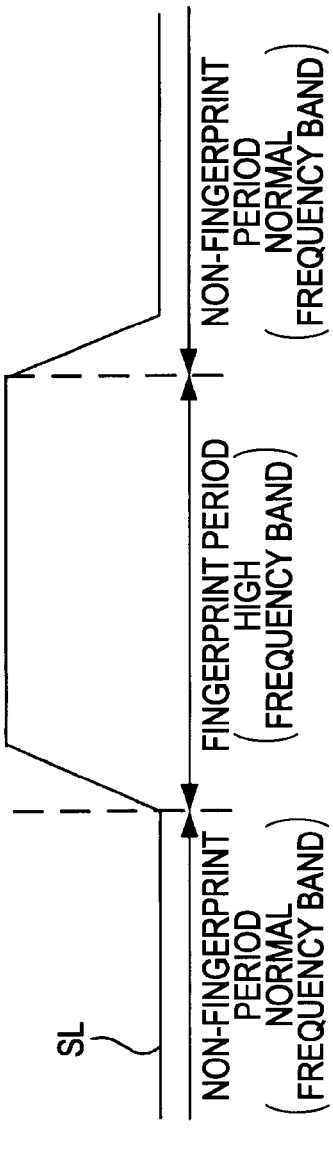

As for a reproduced signal associated with a fingerprint area, the amplitude of the reproduced signal and the amount of offset from the center level simultaneously vary. Accordingly, the center level waveform CL is compared to the threshold th3 as shown in FIG. 7B, thereby detecting a fingerprint period. In other words, a comparison result signal as shown in FIG. 7C is obtained. The fingerprint detector 63 supplies the signal indicating the detection of the fingerprint period as a band selection signal SL to each of the band selectors 62*a* and 62*b*.

The band selectors 62*a* and 62*b* instruct the offset canceller 51 and the AGC circuit 52 to operate in a frequency band of 15 kHz or less for a period during which the band selection signal SL indicates a non-fingerprint period. Whereas, the band selectors 62*a* and 62*b* instruct the offset canceller 51 and the AGC circuit 52 to operate in a frequency band of 100 kHz or less for a period during which the band selection signal SL indicates a fingerprint period.

In other words, the band switching controller 60 controls the offset canceller 51 and the AGC circuit 52 so that the operating frequency band switching control similar to that in the first embodiment shown in FIG. 2 is performed. Consequently, the above-described operation achieves the decoding capability ever provided in a non-fingerprint area and a reduction of a burst error in a fingerprint area, thus improving the total playability.

Figure 8:
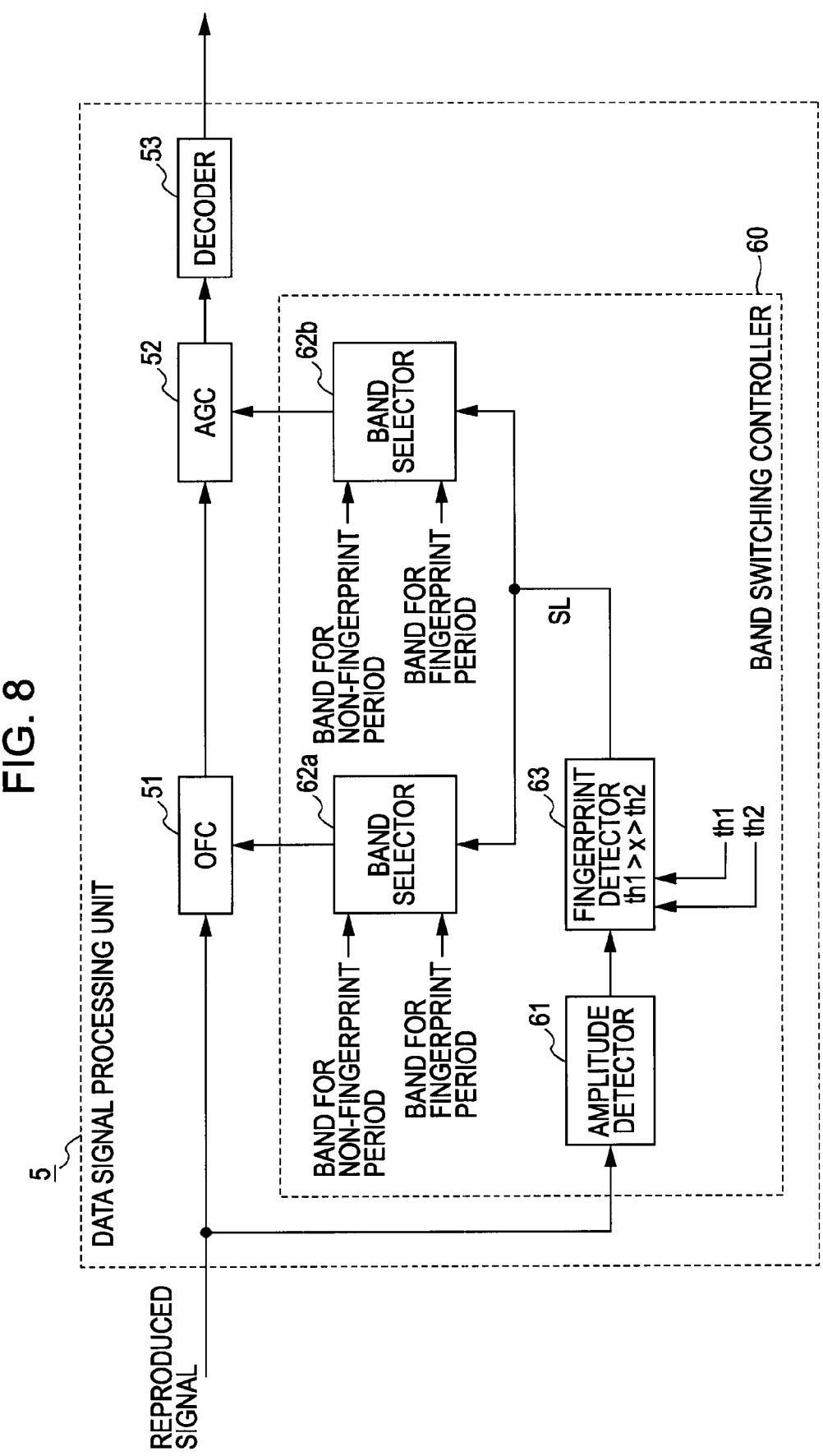
FIG. 8 is a block diagram illustrating the structure of the data signal processing unit in accordance with another embodiment.

4. Structure and Operation for Dealing with Fingerprint According to Third Embodiment FIG. 8 illustrates the structure of the data signal processing unit 5 in accordance with a third embodiment of the present invention. The band switching controller 60 includes the amplitude detector 61, the fingerprint detector 63, and the band selectors 62*a* and 62*b* in a manner similar to the first embodiment shown in FIG. 2. According to the third embodiment, the fingerprint detector 63 uses two thresholds th1 and th2.

During reproducing data from an optical disk, a reproduced signal may be dropped out due to a defect or a scratch occurred during manufacture of the disk in addition to a fingerprint. If the disk has such a defect, any reproduced signal is not obtained. In this case, operating the offset canceller 51 and the AGC circuit 52 in a higher frequency band is not effective. Furthermore, when the operating frequency band of those elements is returned to the normal band, there is concern about an adverse effect of a transient response.

According to this embodiment, therefore, a fingerprint period is detected using the thresholds th1 and th2 as shown in FIG. 8. Only when th1>x>th2, a fingerprint period, namely, a fingerprint area is determined.

Figure 9:
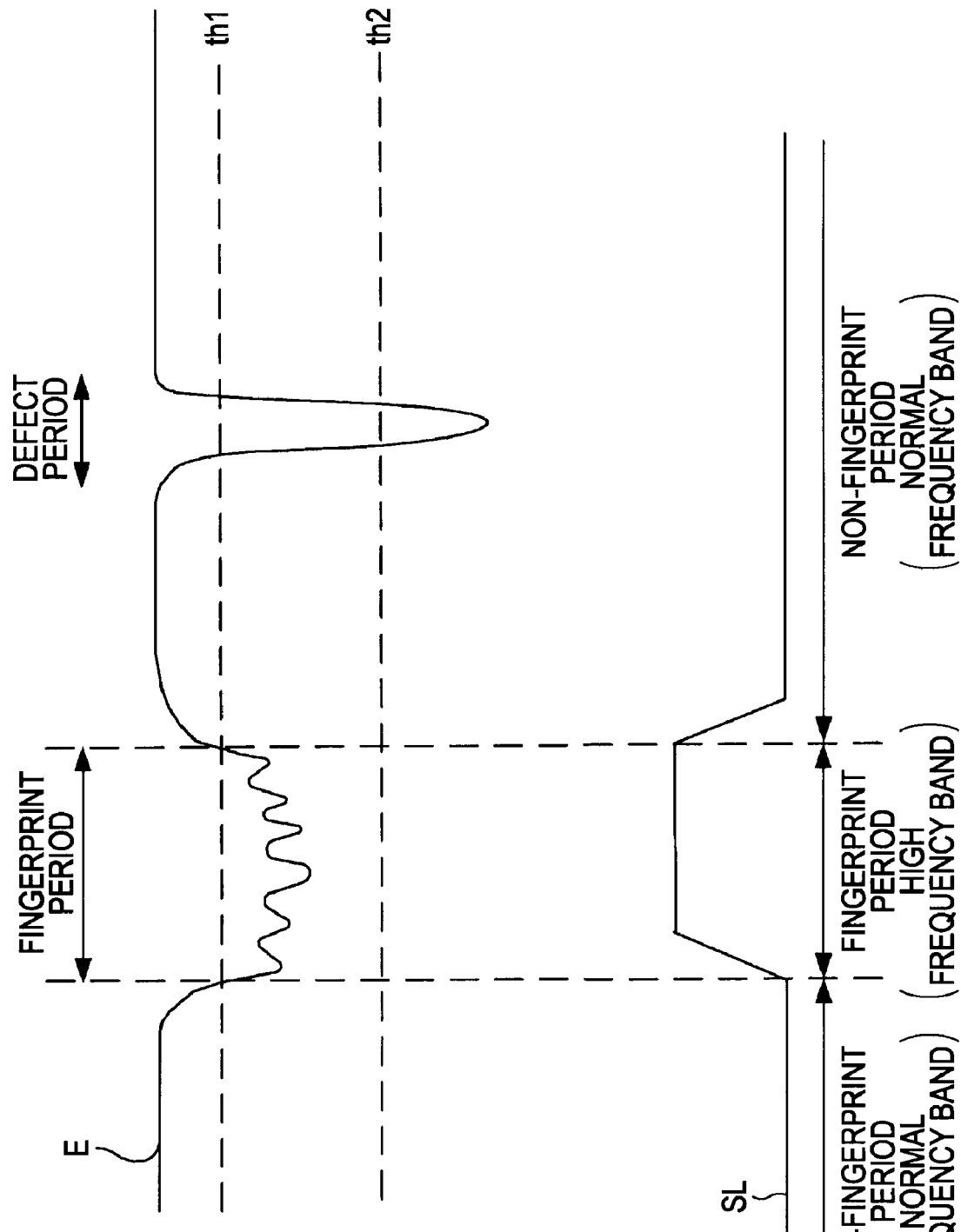
FIGS. 9A and 9B are diagrams explaining an operation for detecting a fingerprint period in accordance with the embodiment.

FIG. 9A schematically shows the waveform of an envelope of a reproduced signal detected by the amplitude detector 61.

For a defect period, the reproduced signal is dropped out, so that the envelope waveform also drops sharply. The fingerprint detector 63 generates a band selection signal SL on the condition that th1>x>th2 as shown in FIGS. 9A and 9B so as not to determine a defect period as a fingerprint period.

The fingerprint detector 63 supplies the band selection signal SL to the band selectors 62a and 62b so that the operating frequency band of the offset canceller 51 and the AGC circuit 52 is switched in a manner similar to the above-described embodiments.

Consequently, for such a defect period during which a reproduced signal is affected by a defect on the disk 90, the operating frequency band of the offset canceller 51 and the AGC circuit 52 is not switched to a high frequency band. Advantageously, the circuit operation can be achieved more safely without being adversely affected by a transient response.

Figure 10:
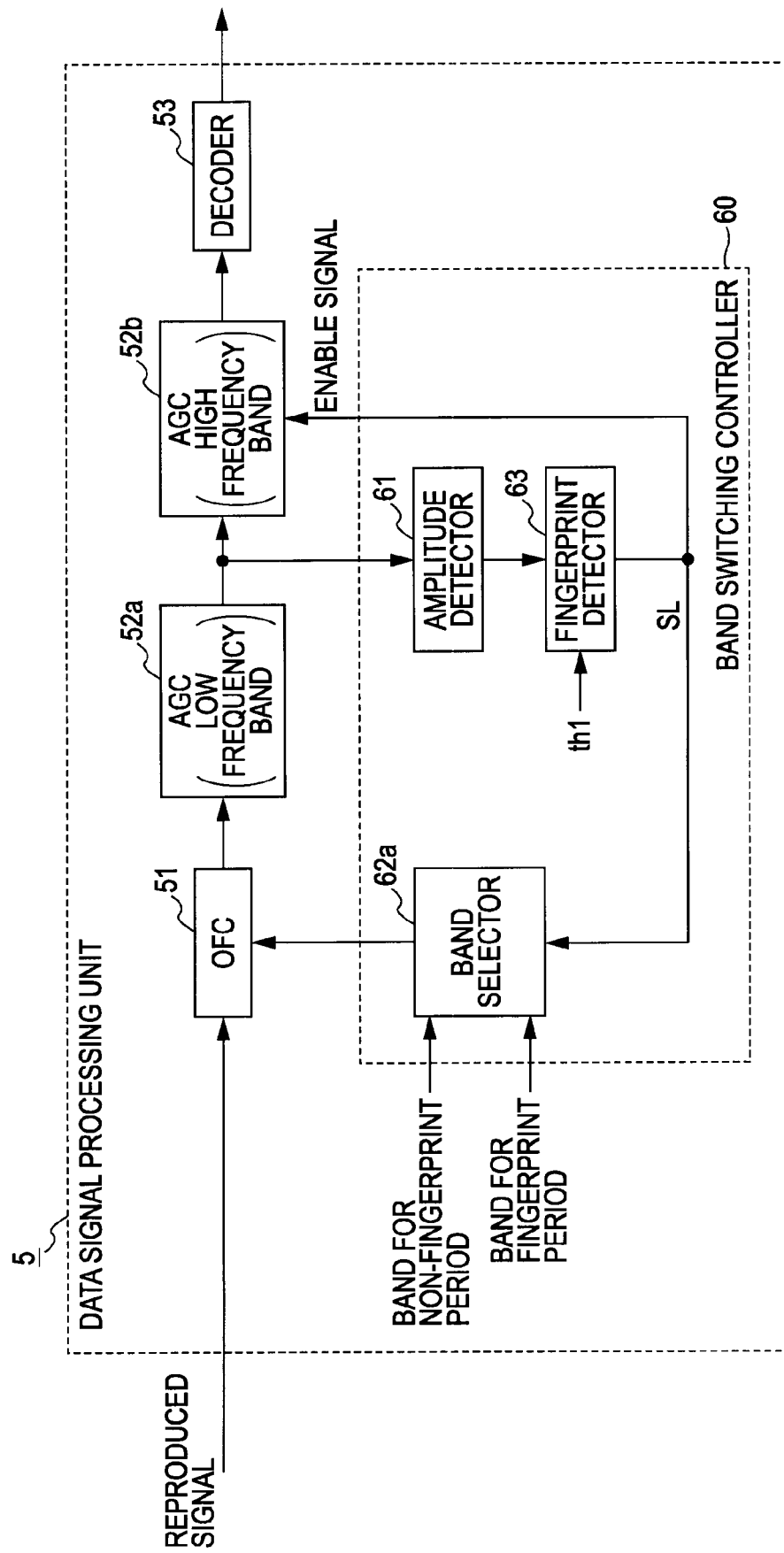
FIG. 10 is a block diagram illustrating the structure of a data signal processing unit in accordance with another embodiment.

5. Structure and Operation for Dealing with Fingerprint According to Fourth Embodiment FIG. 10 illustrates the structure of the data signal processing unit 5 in accordance with a fourth embodiment of the present invention. In this embodiment, the data signal processing unit 5 includes two AGC circuits 52a and 52b which are arranged downstream of the offset canceller 51.

The AGC circuit 52a is configured to operate in a frequency band optimized for a non-fingerprint period, for example, a frequency band up to about 15 kHz. On the other hand, the AGC circuit 52b is configured to operate at a frequency band up to, for example, about 100 kHz so as to deal with a fingerprint period.

The amplitude detector 61 detects the waveform of an envelope of a reproduced signal processed through the offset canceller 51 and the AGC circuit 52a.

The fingerprint detector 63 compares the envelope waveform detected by the amplitude detector 61 with the threshold th1 to generate a band selection signal SL indicating a fingerprint period or a non-fingerprint period. The band selection signal SL is supplied to the band selector 62a and the AGC circuit 52b.

While the band selection signal SL indicates a non-fingerprint period, the band selector 62a instructs the offset canceller 51 to operate in a frequency band of, for example, 15 kHz or less for the non-fingerprint period. Whereas, while the band selection signal SL indicates a fingerprint period, the band selector 62a instructs the offset canceller 51 to operate in a frequency band of, for example, 100 kHz or less for the fingerprint period.

The AGC circuit 52b receives the band selection signal SL as an enable signal. For a fingerprint period indicated by the band selection signal SL, the AGC circuit 52b performs AGC processing. Whereas, for a non-fingerprint period indicated by the band selection signal SL, the AGC circuit 52b does not perform AGC processing, namely, fixes the gain to "1".

With this structure, for a non-fingerprint period, the offset canceller 51 cancels an offset element caused by a disk rotation fluctuation and the AGC circuit 52a adjusts an amplitude fluctuation.

For a fingerprint period, the offset canceller 51 cancels not only an offset fluctuation caused by a disk rotation fluctuation but also that caused by the influence of a fingerprint. Both of the AGC circuits 52a and 52b perform the operation of adjusting the amplitude so as to cover dealing with the influence of a fingerprint.

In other words, the decoding capability ever provided in a non-fingerprint area and a reduction of a burst error in a fingerprint area are achieved similar to those in the foregoing embodiments, thus improving the total playability.

In the structure according to this embodiment shown in FIG. 10, the amplitude detector 61 performs envelope waveform detection on a reproduced signal processed through the offset canceller 51 and the AGC circuit 52a, namely, the reproduced signal in which an offset element and an amplitude fluctuation element produced by a cause other than a fingerprint are removed. This means that only the fluctuation element caused by a fingerprint in a higher frequency band can be monitored. Consequently, the accuracy of detection of a fingerprint period by the fingerprint detector 63 (i.e., the accuracy of the band selection signal SL) can be increased.

In addition, since the operating frequency band of the AGC circuits 52a and 52b is not switched, there is no influence of a transient response upon switching.

6. Advantages of Embodiments

As described above, according to the structures and operations of the respective embodiments, a reproduced signal is subjected to offset cancellation and AGC processing in a high frequency band only while the reproduced signal is affected by a fingerprint. Accordingly, a fluctuation in the amplitude of the reproduced signal or a disturbance on the asymmetry thereof caused by a fingerprint can be favorably corrected. In addition, since offset cancellation and AGC processing in a high frequency band are not performed for a non-fingerprint period, offset cancellation and AGC processing do not affect the elements of a reproduced signal. Consequently, resistance to a fingerprint is increased, thus remarkably improving the playability.

According to the operations of the respective embodiments, the effect of improving resistances not only to a fingerprint but also to another contamination on the recording surface of a disk can be expected. In other words, the playability of an optical disk drive on a removable medium contaminated with a fingerprint or another contamination to be dealt with can be improved.

It should be understood by those skilled in the art that various modifications, combinations, sub-combinations and alterations may occur depending on design requirements and other factors insofar as they are within the scope of the appended claims or the equivalents thereof.

The reproducing apparatus according to any of the embodiments of the present invention is applicable not only to a disk drive compatible with a Blu-ray Disc but also to a wide variety of other apparatuses for playing various optical disks.

What is claimed is:
1. A reproducing apparatus comprising:
   a reproducing head unit that irradiates an optical disk with a laser beam to obtain a reproduced signal as a reflected light signal;
   an offset cancellation circuit that cancels an offset element of the reproduced signal;
   an automatic gain control circuit that adjusts the amplitude of the reproduced signal processed through the offset cancellation circuit;
   a band switching control unit that detects a fingerprint period during which the reproduced signal is affected by a fingerprint on the surface of the optical disk and, for the fingerprint period, switches a frequency band in which the offset cancellation circuit and the automatic gain control circuit function to a higher frequency band than that associated with a non-fingerprint period;

a decoding unit that decodes the reproduced signal processed through the automatic gain control circuit to output binary data; and a data reproduction processing unit that performs data reproduction processing on the binary data output from the decoding unit to obtain reproduced data.

2. The apparatus according to claim 1, wherein the band switching control unit detects an amplitude envelope of the reproduced signal and compares the amplitude envelope with a predetermined threshold to detect the fingerprint period.

3. The apparatus according to claim 1, wherein the band switching control unit detects an offset fluctuation in center level of the reproduced signal and compares the offset level with a predetermined threshold to detect the fingerprint period.

4. The apparatus according to claim 1, wherein the band switching control unit detects an amplitude envelope of the reproduced signal and compares the amplitude envelope with first and second thresholds to detect the fingerprint period.

5. The apparatus according to claim 1, wherein the automatic gain control circuit includes a first automatic gain control circuit segment that functions in a normal frequency band associated with the non-fingerprint period and a second automatic gain control circuit segment that functions in a high frequency band associated with the fingerprint period, and the band switching control unit controls the second automatic gain control circuit segment to function only for the fingerprint period.

6. A reproducing method for a reproducing apparatus including a reproducing head unit that irradiates an optical disk with a laser beam to obtain a reproduced signal as a reflected light signal, an offset cancellation circuit that cancels an offset element of the reproduced signal, an automatic gain control circuit that adjusts the amplitude of the reproduced signal processed through the offset cancellation circuit, a decoding unit that decodes the reproduced signal processed through the automatic gain control circuit to output binary data, and a data reproduction processing unit that performs data reproduction processing on the binary data output from the decoding unit to obtain reproduced data, the method comprising the steps of:

detecting a fingerprint period during which the reproduced signal is affected by a fingerprint on the surface of the optical disk; and switching, for the fingerprint period, a frequency band in which the offset cancellation circuit and the automatic gain control circuit function to a higher frequency band than that associated with a non-fingerprint period to allow the offset cancellation circuit and the automatic gain control circuit to perform offset cancellation and amplitude adjustment.

* * * * *